(12) United States Patent
Qin

(10) Patent No.: US 9,118,399 B2
(45) Date of Patent: Aug. 25, 2015

(54) METHODS, APPARATUSES AND COMPUTER PROGRAM PRODUCTS FOR CODE CORRELATION OF MULTI-PATH SPREAD SPECTRUM SIGNALS

(71) Applicant: Core Wireless Licensing S.a.r.l, Luxembourg (LU)

(72) Inventor: Zhengdi Qin, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 14/093,037

(22) Filed: Nov. 28, 2013

(65) Prior Publication Data

US 2014/0086282 A1    Mar. 27, 2014

Related U.S. Application Data

(62) Division of application No. 12/593,944, filed as application No. PCT/IB2007/002080 on Apr. 2, 2007, now Pat. No. 8,625,657.

(51) Int. Cl.
*H04B 1/7075* (2011.01)
*H04B 1/7085* (2011.01)

(52) U.S. Cl.
CPC ............ *H04B 1/7075* (2013.01); *H04B 1/7085* (2013.01)

(58) Field of Classification Search
CPC ............................ H04B 1/7075; H04B 1/7085
USPC ........................... 375/145, 149, 142, 150, 343
See application file for complete search history.

(56) References Cited

U.S. PATENT DOCUMENTS

| | | | |
|---|---|---|---|
| 5,347,536 A | 9/1994 | Meehan | |
| 5,495,499 A | 2/1996 | Fenton et al. | |
| 5,809,064 A | 9/1998 | Fenton et al. | |
| 5,903,597 A * | 5/1999 | Pon | 375/150 |
| 6,198,765 B1 | 3/2001 | Cahn et al. | |
| 6,463,091 B1 | 10/2002 | Zhodzicshsky et al. | |
| 6,493,378 B1 | 12/2002 | Zhodzishsky et al. | |
| 8,625,657 B2 * | 1/2014 | Qin | 375/150 |
| 2001/0002203 A1 | 5/2001 | Cahn et al. | |
| 2007/0098055 A1 | 5/2007 | Raman et al. | |
| 2007/0121708 A1 * | 5/2007 | Simpson | 375/149 |

FOREIGN PATENT DOCUMENTS

| | | |
|---|---|---|
| EP | 1117186 | 7/2001 |
| WO | 9935763 | 7/1999 |

OTHER PUBLICATIONS

Roberts, Randy, "Technical Tricks, Mar. 1993; More About Sliding Correlators," 1 pg.
"All About Correlators," Feb. 1993, Spread Spectrum Scene, Spring 96 Issue of What's New, Apr. 29, 7 pgs.
EP Search Report dated Oct. 24, 2012.

* cited by examiner

*Primary Examiner* — Betsy Deppe
(74) *Attorney, Agent, or Firm* — Core Wireless Licensing

(57) ABSTRACT

A method including correlating a code having a first offset with a signal to produce a first correlation result; correlating the code having a second offset with the signal to produce a second correlation result; determining a cost function using the first correlation result and the second correlation result; and adjusting the first offset and the second offset in dependence upon the cost function, wherein the cost function uses a first weighting for the first correlation result and a second, different weighting for the second correlation result.

18 Claims, 2 Drawing Sheets

METHODS, APPARATUSES AND COMPUTER PROGRAM PRODUCTS FOR CODE CORRELATION OF MULTI-PATH SPREAD SPECTRUM SIGNALS

CROSS REFERENCE TO RELATED APPLICATIONS

This application is a divisional of U.S. application Ser. No. 12/593,944, filed 12 Nov. 2009, which is the National Stage of International Application Serial Number: PCT/IB2007/02080, filed 2 Apr. 2007, which are incorporated herein in their entirety.

FIELD

Embodiments of the present invention relate to correlating a code with a signal. Some embodiments relate to correlating a spreading code and a received spread spectrum communications signal that may be subject to multi-path effects.

BACKGROUND

Spread spectrum communication techniques spread information using a pseudorandom spreading code and then transmit the spread signal. A receiver receives the spread signal and correlates the received signal against the same pseudorandom spreading code. A peak in the correlation indicates the time of arrival of the spread signal and the correlation result at that code offset provides the original information.

A problem can arise when a spread signal takes multiple different paths to the receiver by, for example, bouncing off the ground or surrounding topography or buildings. The signal from one path is noise in respect of the signal from another path.

It would be desirable to provide a receiver that operates effectively in the presence of multi-path spread spectrum signals.

SUMMARY

According to some embodiments of the invention there is provided a method comprising: correlating a code having a first offset with a signal to produce a first correlation result; correlating the code having a second offset with the signal to produce a second correlation result; determining a cost function using the first correlation result and the second correlation result; and adjusting the first offset and the second offset in dependence upon the cost function, wherein the cost function uses a first weighting for the first correlation result and a second, different weighting for the second correlation result.

According to some embodiments of the invention there is provided an apparatus comprising: a code generator configured for generating a code having a first offset and the code with a second offset; a first correlator configured for correlating the code having the first offset with a signal to produce a first correlation result; a second correlator configured for correlating the code having the second offset with the signal to produce a second correlation result; circuitry configured for determining a cost function using the first correlation result and the second correlation result and configured for controlling adjustment of the first offset and the second offset in dependence upon the cost function, wherein the cost function uses a first weighting for the first correlation result and a second, different weighting for the second correlation result.

According to some embodiments of the invention there is provided a computer program product which when loaded into a processor enables: determining a cost function using a first correlation result, formed by correlation of a code having a first offset with a signal, and a second correlation result, formed by correlation of the code having a second offset with the signal; controlling adjustment of the first offset and the second offset in dependence upon the cost function, wherein the cost function uses a first weighting for the first correlation result and a second, different weighting for the second correlation result.

According to some embodiments of the invention there is provided a method comprising: a) correlating a code having a first offset with a signal to produce a first correlation result; b) correlating the code having a second offset with the signal to produce a second correlation result; c) determining a cost function using the first correlation result and the second correlation result; and d) adjusting the first offset and the second offset in dependence upon the cost function to maintain a predetermined differential relationship between the first correlation result and the second correlation result.

According to some embodiments of the invention there is provided an apparatus comprising: a code generator configured for generating a code having a first offset and the code with a second offset; a first correlator configured for correlating the code having the first offset with a signal to produce a first correlation result; a second correlator configured for correlating the code having the second offset with the signal to produce a second correlation result; circuitry configured for determining a cost function using the first correlation result and the second correlation result and for configured controlling adjustment of the first offset and the second offset in dependence upon the cost function to maintain a predetermined differential relationship between the first correlation result and the second correlation result.

According to some embodiments of the invention there is provided a computer program product which when loaded into a processor enables: determining a cost function using a first correlation result, formed by correlation of a code having a first offset with a signal, and a second correlation result, formed by correlation of the code having a second offset with the signal; controlling adjustment of the first offset and the second offset in dependence upon the cost function to maintain a predetermined differential relationship between the first correlation result and the second correlation result.

The correlation that occurs using the first code with the first offset is an early correlation when it occurs with a code offset that is before that of the punctual signal and the correlation that occurs using the second code with the second offset is a late correlation because it occurs with a code offset that is after that of the punctual signal. By using values for the first offset and the second offset that are asymmetrically spaced on either side of that for the punctual signal so that the first offset is greater than the second offset, the decision window for the late correlation is reduced compared to that for the early correlation. The correlation process is therefore less affected by multi-path effects because the late correlation window is smaller.

BRIEF DESCRIPTION OF THE DRAWINGS

For a better understanding of the present invention reference will now be made by way of example only to the accompanying drawings in which.

DETAILED DESCRIPTION

Figure 1:
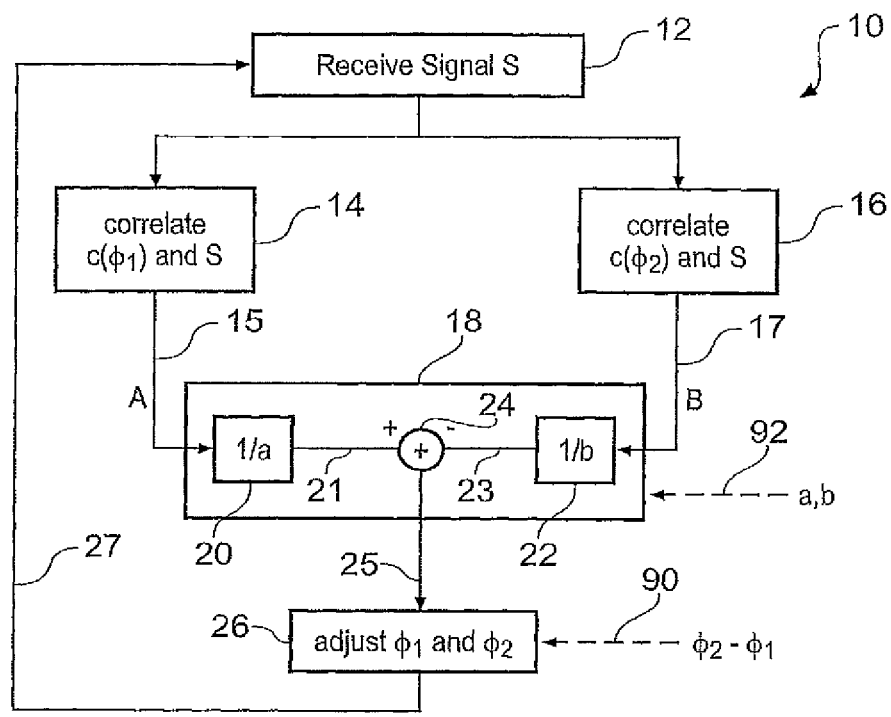
FIG. 1 schematically illustrates a method for controlling correlation of a signal s and a code c.

FIG. 1 schematically illustrates a method 10 for controlling correlation of a signal s and a code c.

The signal s is typically a received spread spectrum communication signal that has been spread using a pseudorandom spreading code c. The received spread spectrum communication signal is then de-spread by correlation with the same pseudorandom spreading code c. At least two different correlations occur, with different offsets of the pseudorandom spreading code c.

Referring to FIG. 1, at step 12 the signal s is received.

Next at step 14, the code c having a first offset $\phi_1$ is correlated with the signal s to produce 15 a first correlation result A. At step 16, the same code c having a second offset $\phi_2$ is correlated with the signal s to produce 17 a second correlation result B. The second offset, $\phi_2$ is delayed (late) relative to the first offset $\phi_1$ (early).

Figure 2:
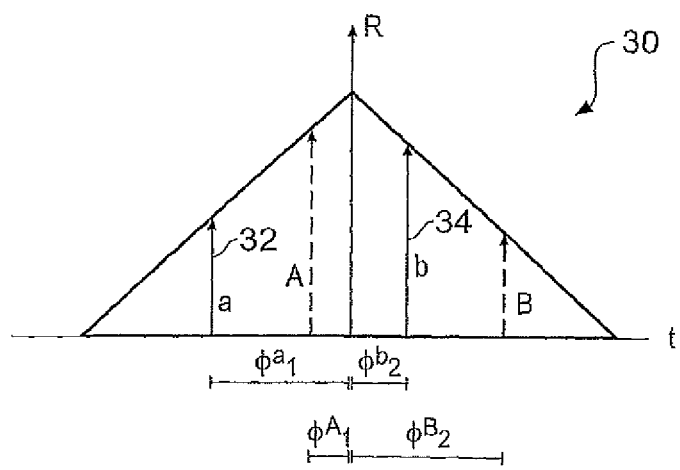
FIG. 2 illustrates 30 the auto-correlation function of the correlation processes.

FIG. 2 illustrates one auto-correlation function R 30 that could be used for the correlation steps 14, 16. This particular auto-correlation can be represented as:

$$R(t) = 1 - t/T \text{ for } -T \le t \le T$$

$$R(t) = 0 \text{ for elsewhere.}$$

T is the chip interval of the code c.

This correlation function is a simplistic view of a typical correlation function which is used for clarity. It should be appreciated that a 'real' correlation function R may differ significantly from the simplistic function illustrated and its slopes may, for example, be non-linear.

The normalized values of the first correlation result A and the second correlation result B before feedback loop obtained lock is reached are schematically illustrated in the figure. The first correlation result A at feedback loop obtained lock is also illustrated and has a value a. The second correlation result B at feedback loop obtained lock is also illustrated and has a value b. The first offset of the code c used to obtain the first correlation result A has as a generality a value $\phi^A_1$ and at feedback loop obtained lock has a value $\phi^a_1$. The second offset of the code c used to obtain the second correlation result B has as a generality a value $\phi^B_2$ and at feedback loop obtained lock has a value $\phi^b_2$. It should be appreciated that the value of $\phi^B_2 - \phi^A_1$ is a constant, although it may be user programmable 90.

A cost function F may be defined as:

$$F = (A/a - B/b)$$

where $a \ne b$ and where a is the value of the correlation function, at feedback loop obtained lock, at the first offset $\phi^a_1$ and b is the value of the correlation function, at feedback loop obtained lock, at the second offset $\phi^b_2$.

This function is zero valued at feedback loop obtained lock.

The relative values of a and b may be user programmable 92. The value a+b need not be a constant and may vary. The values of a and b may vary independently.

For example, the value a and/or the value of b and/or the value of a+b may be varied dynamically. In one embodiment, the size of the correlation window (a+b) is varied and/or the ratio of b/a is varied using a feedback loop to obtain optimal reception. This may result in a smaller correlation window being used in urban environments for example.

Referring back to FIG. 1, after obtaining the first correlation result A and the second correlation result B, at step 18 the cost function F is determined using the first correlation result A and the second correlation result B.

The value of the cost function F is used to adjust the first offset $\phi_1$ and the second offset $\phi_2$ and the adjusted values are fedback via feedback loop 27 and the method 10 is repeated. The feedback loop 27 may be a delay locked loop (DLL) or a phase locked loop (PLL). If the cost function F is +ve, then the first offset $\phi_1$ and the second offset $\phi_2$ are both reduced by an amount dependent upon the magnitude of F. If the cost function F is −ve, then the first offset $\phi_1$ and the second offset $\phi_2$ are both increased by an amount dependent upon the magnitude of F. The difference between $\phi_1$ and $\phi_2$ therefore remains constant. Referring back to FIG. 2, this has the effect of moving A and B towards a and b, i.e. the method 10 finds a feedback loop obtained lock via a negative feedback.

When feedback loop obtained lock has been achieved, the method 10 maintains a predetermined relationship between the first correlation result A and the second correlation result B, i.e. A/B=a/b where a/b<1.

Figure 3:
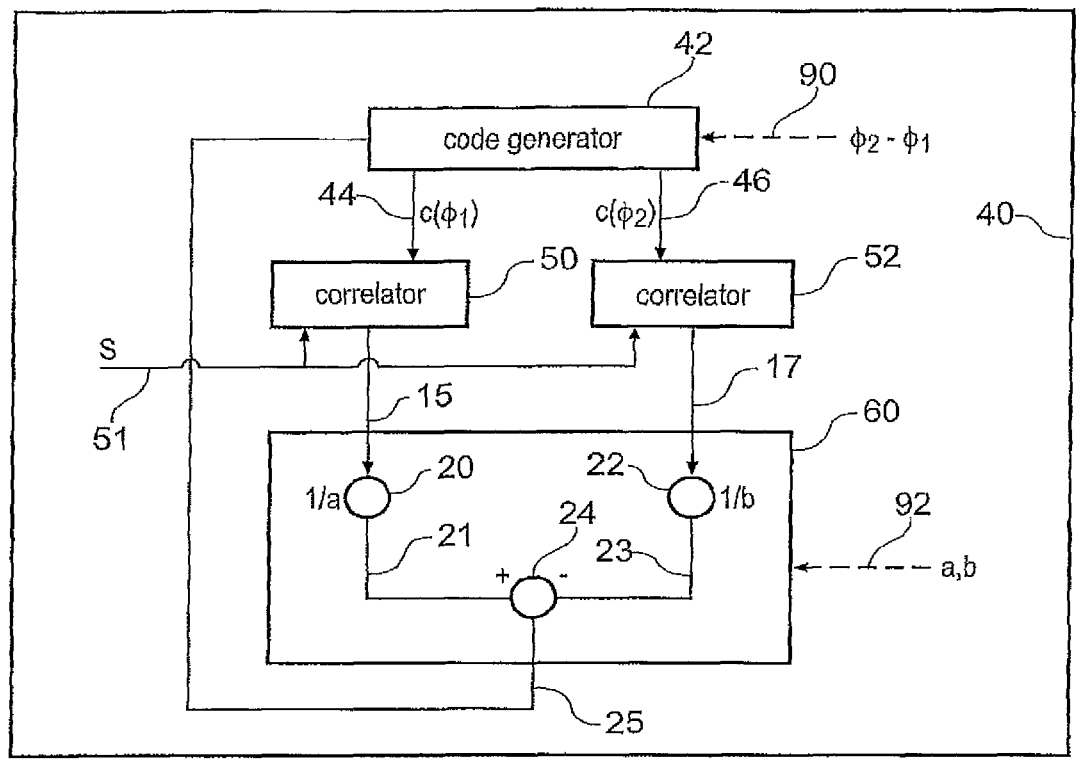
FIG. 3 schematically illustrates an apparatus that is suitable for performing the method illustrated in FIG. 1.

FIG. 3 schematically illustrates an apparatus 40 that is suitable for performing the method 10. The apparatus 40 comprises a code generator 42 for generating a code 44 with a first offset and a code 46 with a second offset, a first correlator 50 for producing the first correlation result A, a second correlator 52 for producing the second correlation result B and circuitry 60 for controlling the code generator 42. The first correlator 50 and the second correlator 52 receive the signal s 51.

The first correlator 50 performs step 14 of the method 10. The second correlator 52 performs step 16 of the method 10. The circuitry 60 performs step 18 of the method 10. The code generator performs step 26 of the method 10.

The circuitry 60 comprises a first multiplier 20 that applies a first weighting (1/a) to the first correlation result A to produce a first weighted correlation result 21. The circuitry 60 comprises a second multiplier 22 that applies a second weighting (1/b) to the second correlation result B to produce a second weighted correlation result 23.

The circuitry 60 subtracts one of the weighted first and second correlation results from the other of the first and second weighted correlation results to produce the cost function value 25. In this implementation, the second weighted correlation result 23 (B/b) is subtracted from the first weighted correlation result 21 (A/a) as described in relation to block 24 of the method shown in FIG. 1.

The cost function value 25 controls the code generator 42 to adjust the first offset and the second offset in dependence upon the cost function value 25 as described in relation to step 26 of the method 10.

The apparatus 40 may in some embodiments be a module that is sold for integration into or attachment to an electronic device. The apparatus 40 may in some embodiments be an electronic device. An electronic device may be, for example, a mobile cellular telephone, a personal wireless communication device, a satellite positioning receiver etc.

Figure 4:
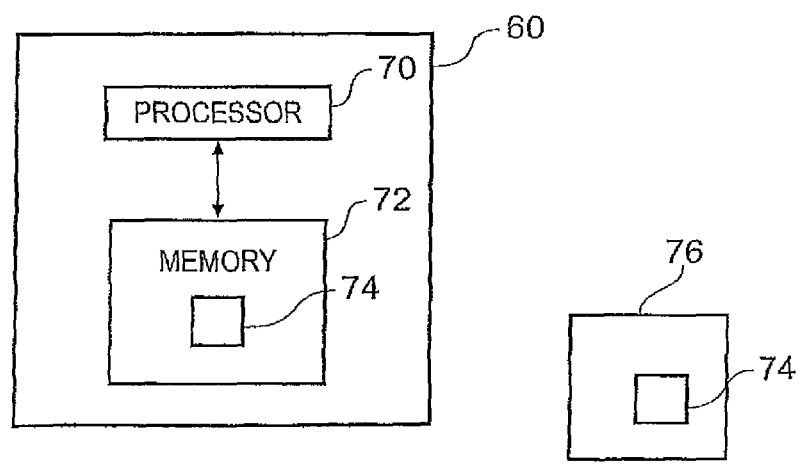
FIG. 4 schematically illustrates one embodiment of circuitry used in the apparatus.

The circuitry 60 of the apparatus 40 may be implemented in software, firmware or hardware. FIG. 4 schematically illustrates a software implementation.

FIG. 4 schematically illustrates a computer comprising a processor or controller 70 and a memory 72. The memory 72 stores computer program instructions 74 that control the operation of the circuitry 40 when loaded into the processor 70. The computer program instructions 74 provide the logic and routines that enables the electronic device to perform at least step 18 of method 10.

The computer program instructions may arrive as a computer program product at the circuitry 40 via an electromagnetic carrier signal or be copied from a physical entity 76 such as a computer program product, a memory device or a record medium such as a CD-ROM or DVD.

The computer program product determines the cost function F using the first correlation result A (formed by correlation of a code having a first offset with a signal) and the second correlation result B (formed by correlation of the code having a second offset with the signal) and controls adjustment of the first offset and the second offset in dependence upon the cost function F. At feedback loop obtained lock the computer program product controls adjustment of the first offset and the second offset in dependence upon the cost function F to maintain a predetermined relationship between the first correlation result A and the second correlation result B, i.e. A/B=a/b.

Although embodiments of the present invention have been described in the preceding paragraphs with reference to various examples, it should be appreciated that modifications to the examples given can be made without departing from the scope of the invention as claimed. For example, although a particular cost function F has been described it will be appreciated that different costs functions may be used, in particular, differently expressed but mathematically equivalent cost functions may be used and reference to 'cost function' or 'cost function F' should be interpreted accordingly.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method comprising:
   using a correlation function to correlate a pseudo-random spreading code having a first offset with a spread signal to produce a first correlation result;
   using the correlation function to correlate the pseudo-random spreading code having a second offset with the spread signal to produce a second correlation result;
   applying a first weight to the first correlation result to generate a first weighted correlation result, wherein the first weight is the value of the correlation function at feedback loop obtained lock at the first offset;
   applying a second weight to the second correlation result to generate a second weighted correlation result, wherein the second weight is the value of the correlation function at feedback loop obtained lock at the second offset;
   determining a value of a cost function using the first weighted correlation result and the second weighted correlation result; and
   adjusting the first offset and the second offset in dependence upon the value of the cost function.

2. A method as claimed in claim 1, wherein the first weight is different from the second weight.

3. A method as claimed in claim 1, wherein a ratio of the second weight to the first weight is less than 1.

4. A method as claimed in claim 1, further comprising dynamically varying the first weight and the second weight.

5. A method as claimed in claim 1, wherein a sum of an inverse of the first weight and an inverse of the second weight is a correlation window, and the method further comprises varying a size of the correlation window.

6. A method as claimed in claim 1, further comprising varying a ratio of the first weight to the second weight.

7. An apparatus comprising:
   a code generator operable to generate a pseudo-random spreading code having a first offset and the same pseudo-random spreading code having a second offset;
   a first correlator operable to use a correlation function to correlate the pseudo-random spreading code having the first offset with a spread signal to produce a first correlation result;
   a second correlator operable to use the correlation function to correlate the pseudo-random spreading code having the second offset with the spread signal to produce a second correlation result; and
   circuitry operable to:
      apply a first weight to the first correlation result to generate a first weighted correlation result, wherein the first weight is the value of the correlation function at feedback loop obtained lock at the first offset;
      apply a second weight to the second correlation result to generate a second weighted correlation result, wherein the second weight is the value of the correlation function at feedback loop obtained lock at the second offset;
      determine a value of a cost function using the first weighted correlation result and the second weighted correlation result; and
      adjust the first offset and the second offset in dependence upon the value of the cost function.

8. An apparatus as claimed in claim 7, wherein the first weight is different from the second weight.

9. An apparatus as claimed in claim 7, wherein a ratio of the second weight to the first weight is less than 1.

10. An apparatus as claimed in claim 7, wherein the circuitry is further operable to dynamically vary the first weight and the second weight.

11. An apparatus as claimed in claim 7, wherein a sum of an inverse of the first weight and an inverse of the second weight is a correlation window, and the circuitry is further operable to vary a size of the correlation window.

12. An apparatus as claimed in claim 7, wherein the circuitry is further operable to vary a ratio of the first weight to the second weight.

13. A device comprising:
   a code generator operable to generate a pseudo-random spreading code having a first offset and the same pseudo-random spreading code having a second offset;
   a first correlator operable to use a correlation function to correlate the pseudo-random spreading code having the first offset with a spread signal to produce a first correlation result;
   a second correlator operable to use the correlation function to correlate the pseudo-random spreading code having the second offset with the spread signal to produce a second correlation result; and
   circuitry comprising:
      a processor; and
      a non-transitory computer-readable memory storing computer program instructions that when executed by the processor enables the circuitry to:
         apply a first weight to the first correlation result to generate a first weighted correlation result, wherein the first weight is the value of the correlation function at feedback loop obtained lock at the first offset;

apply a second weight to the second correlation result to generate a second weighted correlation result, wherein the second weight is the value of the correlation function at feedback loop obtained lock at the second offset; and determine a value of a cost function using the first weighted correlation result and the second weighted correlation result, wherein the code generator is operable to adjust the first offset and the second offset in dependence upon the value of the cost function.

14. A medium as claimed in claim 13, wherein the first weight is different from the second weight.

15. A medium as claimed in claim 13, wherein a ratio of the second weight to the first weight is less than 1.

16. A medium as claimed in claim 13, wherein the logic is further operable to dynamically vary the first weight and the second weight.

17. A medium as claimed in claim 13, wherein a sum of an inverse of the first weight and an inverse of the second weight is a correlation window, and wherein the logic is further operable to vary a size of the correlation window.

18. A medium as claimed in claim 13, wherein the logic is further operable to vary a ratio of the first weight to the second weight.

* * * * *